United States Patent [19]

Ferris et al.

[11] Patent Number: 5,143,155
[45] Date of Patent: Sep. 1, 1992

[54] BACTERIOGENIC MINERAL PLUGGING

[75] Inventors: Frederick G. Ferris; Lester G. Stehmeier, both of Calgary, Canada

[73] Assignee: Husky Oil Operations Ltd., Calgary, Canada

[21] Appl. No.: 664,769

[22] Filed: Mar. 5, 1991

[51] Int. Cl.$^5$ ............................................. E21B 43/22
[52] U.S. Cl. ................................... 166/246; 166/273; 166/274
[58] Field of Search ................ 166/246, 270, 273, 274

[56] References Cited

U.S. PATENT DOCUMENTS

| | | | |
|---|---|---|---|
| 4,446,919 | 5/1984 | Hitzman | 166/246 |
| 4,460,043 | 7/1984 | Thompson et al. | |
| 4,475,590 | 10/1984 | Brown | 166/246 |
| 4,558,739 | 12/1985 | McInerney et al. | 166/246 |
| 4,561,500 | 12/1985 | Thompson et al. | |
| 4,799,545 | 6/1989 | Silver et al. | 166/246 |
| 4,905,761 | 3/1990 | Bryant | 166/246 |
| 4,947,932 | 8/1990 | Silver et al. | 166/246 |
| 4,971,151 | 11/1990 | Sheehy | 166/246 |

*Primary Examiner*—Ramon S. Britts
*Assistant Examiner*—Frank S. Tsay
*Attorney, Agent, or Firm*—Stevens, Davis, Miller & Mosher

[57] ABSTRACT

A process is provided for reducing the porosity/permeability of a subsurface geological formation. The process generally involves the precipitation of minerals from an aqueous system. The minerals are precipitated in the presence of microorganisms. The process may be suitably utilized to enhance the recovery of oil from oil reservoirs or to control the flow of a spilled contaminant in a reservoir.

22 Claims, 1 Drawing Sheet

BACTERIOGENIC MINERAL PLUGGING

FIELD OF THE INVENTION

This invention relates to a process to reduce the porosity/permeability of a subsurface geological formation by using microorganisms to induce mineral precipitation. This process may be suitably employed, for example, to assist with the recovery of oil from oil reservoirs or to control (reduce) the flow of a spilled contaminant in an aquifer.

BACKGROUND OF THE INVENTION

The process of this invention is generally applicable to the control of subsurface fluid movement through the reduction of porosity/permeability of geological formations. The process is especially suitable for use in the recovery of oil from hydrocarbon reservoirs.

In the recovery of oil from oil-bearing reservoirs, it is often possible to recover only a portion of the oil contained in the underground formation by the so-called primary recovery methods which utilize the natural forces present in the reservoir. Exceptionally poor oil recovery can be due to a number of factors including the breakthrough of an overlying gas body or an edge or bottom water to the production well by coning or channelling. This is particularly evident where reservoir heterogeneities such as fractures or high permeability streaks are selectively depleted of oil allowing the premature entry of adjacent gas or water into the production zone. In heavy oil fields, the relatively low viscosity and high mobility of a water phase allows such breakthrough even in homogeneous reservoirs by channelling or fingering of the water through the relatively immobile oil phase. Once highly water permeable channels are established, heavy oil production is lost.

A variety of enhanced recovery techniques, so-called secondary or tertiary recovery, have been employed in order to increase the recovery of oil from subterranean reservoirs. In one form of the enhanced recovery of oil, a drive fluid is injected under pressure into the oil reservoir through one or more injection wells to maintain, restore or produce formation pressure. The most widely used drive fluid is water, however, more complex aqueous systems, solvents and gases are also useful as drive fluids. Steam is often employed for heavy oils. The drive fluid is frequently introduced into the oil-bearing underground formation near the bottom of the formation at or above formation pressure, to displace oil in the reservoir. As the fluid moves through the reservoir, it drives or flushes the oil through the formation. An increased oil saturation develops ahead of the moving fluid and finally reaches the production well or wells.

Generally, an oil-bearing underground formation will consist of various regions having different permeabilities. Drive fluid moving through the reservoir preferentially moves to and through regions of higher permeability, fractures and the like. Drive fluids will pass predominantly through such channels bypassing regions of lower permeability and, thus, bypass oil contained in such lower permeability regions. This obviously reduces the sweep efficiency of the displacing medium.

The problems associated with enhanced oil recovery tend to be particularly acute when the oil is the highly viscous, so-called "heavy oil" which exists in the Lloydminster region in Canada and in certain reservoirs located in Alaska and Venezuela. In such heavy oil reservoirs, primary recovery and conventional water-flooding operations are sometimes estimated to produce as little as 4% to 8% of the oil contained in the reservoir.

Accordingly, new techniques to improve the extent and rate of heavy oil production would clearly represent a useful addition to the art.

Oil production may be enhanced through the application of a selective microbial plugging system, as disclosed in U.S. Pat. Nos. 4,460,043 and 4,561,500. However, microbial plugs can be susceptible to damage caused by high velocity fluid flows or large pressure drops across the plug, by thermal degradation in steam drive situations and the like or through the degradation of biological plugging materials by the indigenous microbial population. Thus, there is a need to provide improved plug stability to allow wider application of selective plugging.

As previously noted, the present process is generally applicable to the control of subsurface fluid movement. In this context, the process of this invention might be employed to reduce the permeability of an underground region adjacent to an aquifer, so as to reduce the probability of contamination of the aquifer.

Prior art techniques for reducing permeability in the vicinity of an aquifer often require the injection of noxious chemicals and/or polymers which may themselves contaminate the aquifer.

In summary, prior art techniques to reduce the permeability of subsurface geological formations can be susceptible to damage or large pressure drops across the plug, by thermal degradation in steam drive situations and the like or through the degradation of biological plugging materials by the indigenous microbial population and/or can require the use of noxious chemicals. It is an object of this invention to mitigate these disadvantages of the prior art.

SUMMARY OF THE INVENTION

The present invention provides a process to reduce the permeability of a subsurface geological formation by mineral precipitation, said process consisting of:

(i) providing to said formation a microorganism culture having the capability to sustain metabolic activity within the environment of said formation, (ii) injecting an aqueous mineralization medium into said formation, and (iii) precipitating mineral matter from said mineralization medium.

BRIEF DESCRIPTION OF THE DRAWINGS

The FIGURE is a sketch of the apparatus which was employed in Example 3.

DETAILED DESCRIPTION

Figure 1:
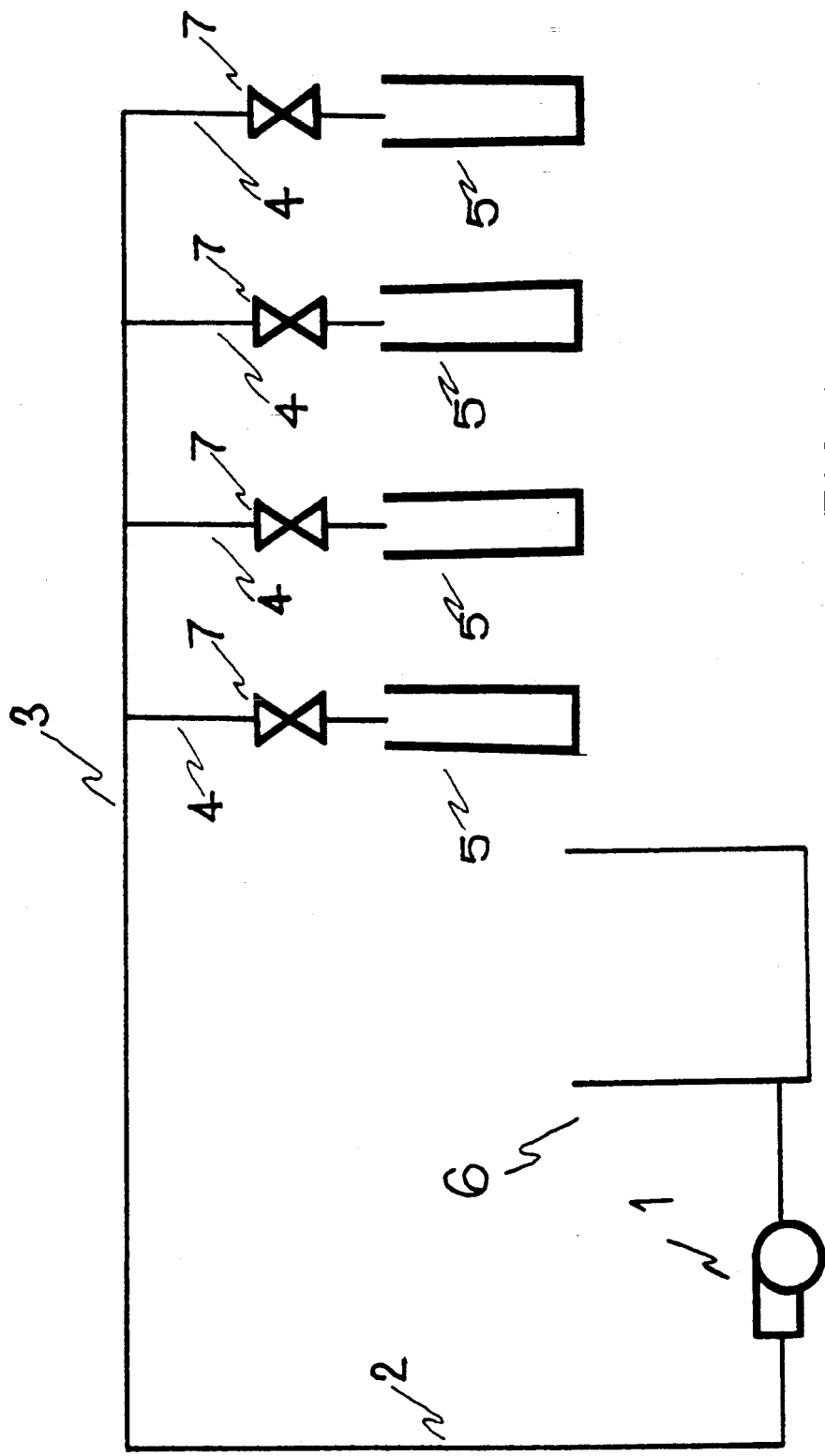

The present invention requires the precipitation of minerals from an aqueous mineralization medium.

As used herein, the term "aqueous mineralization medium" refers to:

(i) aqueous solutions which contain a water soluble mineral, or (ii) colloidal dispersions of a non-soluble mineral, where the context so requires.

Minerals that develop from fluid ions in sediments are said to be "authigenic". The overall process of authigenic mineral precipitation can be divided into two stages, namely, nucleation and crystal growth. Distinctions between the two stages can be made on the energy changes associated with crystallization.

Even if the concentration of mineral ions in a solution gradually increases and exceeds the solubility product of a solid mineral phase, insoluble precipitates will not normally form until a certain degree of supersaturation has been achieved. Stable nuclei can only be formed after an activation energy barrier has been surmounted. The process during which the maximum free energy is attained is known as nucleation, and involves the growth of critical nuclei which are unstable relative to resolution. Once the critical nucleus is formed, further increases in the number of ions (associated with the nucleus) are accompanied by a decrease in free energy. This process is generally referred to as crystal growth. Increasing the extent of oversaturation causes a decrease in both the free energy and the size of the critical nuclei.

Nucleation may occur either homogeneously or heterogeneously. In homogeneous nucleation reactions, critical nuclei are formed by random collisions of ions or atoms in solution. Conversely, heterogeneous nucleation involves the formation of critical nuclei on surfaces of foreign solids which enhance nucleation.

The surface of a "heteronucleus" (i.e. a foreign solid which provides a nucleation site) might be regarded as a template having atomic spacing which promotes precipitation.

While not wishing to be bound by theory, it is believed that the microorganisms which are employed in the present invention may serve as heterogeneous nucleating sites for mineral precipitation.

There is considerable geological evidence which suggests that microorganisms might function as nucleating agents for mineral precipitations. For example, peloids formed of carbonates (especially "high-magnesium calcite", a $CaCO_3$ polymorph), are commonly found in cemented marine sediments in lagoons and reefs. These peloids are elliptical to spheroidal shaped bodies 20 to 60 microns in diameter, and often contain clumps of fossilized bacteria encased within small (micron sized) anhedral crystals of high-magnesium calcite. The peloids are typically rimmed by larger (5 to 10 micron) euhedral crystals which contain no organic matter. The difference in the crystallinity between the peloid nuclei and rims presumably reflects different rates of precipitation. This would be consistent with an initial, rapid precipitation of calcite (leading to the smaller anhedral crystals) followed by a slower rate of precipitation after the mineralization of the bacterial cells (leading to the larger euhedral crystals).

Clumps of fossilized bacteria have also been detected in freshwater travertine deposits, in a manner which suggests that the bacteria might have been associated with the precipitation/deposition which produced the travertine.

Other precipitates, including "phosphorites" (i.e. sediments containing more than 10 volume % of phosphate grains, such as fluorapatite or francolite), sulfides, silicates, iron oxides and magnesium oxides have been observed in association with microorganisms. Thus, there is a substantial body of evidence which indicates that microorganisms can contribute to the precipitation of minerals over geological time (i.e. thousands of years).

Clearly, however, a mineral precipitation process which is to be used to commercial advantage must be completed within a much shorter time span, such as a period of several days. Thus, the present process preferably employs a mineral medium which is at or near saturation, so that precipitation may be quickly induced by altering conditions which affect solubility (such as increasing/decreasing pH or temperature). The minerals then precipitate from the medium in the presence of the microorganisms (thus allowing the microorganisms to act as nucleating agents) to form a bacteriogenic mineral plug.

The mineralization medium is preferably prepared using inexpensive minerals based on the following elements: Ca, Si, Fe, Al and Mg. Specific examples of mineralization media include solutions which contain calcium chloride, sodium bicarbonate, ferrous sulfate, ferric chloride, alum (i.e. aluminum sulfate) or magnesium chloride, and colloidal dispersions of silica. It is permissible to use more than one mineral in the preparation of the mineralization medium.

In a highly preferred embodiment of the present invention, the metabolism of the microorganisms affects the saturation value of the minerals and thus induces precipitation. As a specific example, the metabolism of bacteria of the genus Leuconostoc is known to produce acidic substances. Conversely, certain bacteria of the genus Bacillus can cause the pH of their environment to increase when grown in the presence of urea.

The microorganisms employed in the present invention must be able to sustain metabolic activity in the subsurface environment in which the process is practised. Accordingly, the limits on the subsurface environment in which this invention can be conveniently practised include temperatures of up to 100° C., salinities of up to 9 weight %, a pH between 3 and 9 and pressures of up to 7,000 psi, since these limits generally define the ranges which can be tolerated by suitable microorganisms.

Anaerobic bacteria (including facultative anaerobes) are preferred because of their tolerance for the restricted availability of oxygen, temperature, pH and salinity which can be encountered in subsurface environments.

Spore producing microorganisms, such as bacteria of the Bacillacae family are highly preferred because of their comparatively high tolerance to harsh environments. Additionally, the spores of these bacteria can be conveniently used to inoculate the process site. That is, an injectable "slurry" can be prepared by simply mixing the spores with a liquid medium such as nutrient broth, water or a saline solution (whereas the use of vegetative bacteria requires the comparatively cumbersome preparation of a viable bacteria culture). Injection of spores also facilitates deep penetration of tight geological formations due to the relatively small size and the low adherence of spores to mineral surfaces. Thus, as used herein, the term "microorganism culture" is meant to include both of a bacteria culture, and/or a slurry of spores.

Suitable genera of the Bacillacae family include Bacillus, Sporolactobacillus, Clostridium, Desulfotomaculum and Sporosarcina.

Vegetative bacteria are also suitable for use in the present invention. It is advantageous to inject these bacteria in the form of a culture which is still in the stage of exponential growth. Furthermore, it is generally desirable to adjust the density of the bacterial concentration such that the cell concentration in the subsurface formation is in the range of between $10^4$ and $10^9$ cells/ml (especially between $10^7$ and $10^9$ cells/ml). The bacterial culture is most preferably mixed with a nutrient medium, oil field brine or the like to provide a bacterial "slurry" which is suitable for injection into the subsurface formation.

Examples of preferred bacteria which may be utilized in vegetative form include Leuconostoc and Bacillus.

The above described bacterial slurry and/or spore slurry is generally injected into the subsurface environment in the same manner as water is injected during conventional waterflooding operations. In this way, the injected slurry predominantly enters high permeability zones, since these zones are of the least resistance to the incoming slurry. As will be readily apparent, it is advantageous to employ a slurry which does not spontaneously adhere to the rock and/or sand surfaces of the subsurface environment. In this way, the slurry passes more easily into the high permeability zones.

EXAMPLE 1

This example qualitatively illustrates the formation of a precipitate from a calcium chloride-containing solution, in the presence of bacterial growth.

The bacteria used in this example were *Bacillus pasteurii* NRS 673 and were obtained from the U.S. Department of Agriculture, Northern Regional Laboratory, Peoria, Ill.

An aqueous, calcium-containing mineralization medium was employed. The medium consisted of 3 grams of a nutrient broth (containing 3 g of beef extract and 5 g of peptone per liter, and sold under the trade name "Bacto" by Difco Laboratories of Detroit, Michigan), 20 grams of urea, 10 grams of ammonium chloride, 2.1 grams of sodium bicarbonate and 2.8 grams of calcium chloride per liter of distilled water. The pH of the water was adjusted to 6 before addition of the calcium chloride. This medium was then filtered using a 0.2 micron filter.

The above noted strain of *B. pasteurii* grew well in the mineralization medium, and mineral precipitation was visibly evident.

While not wishing to be bound by any particular theory, it is believed that the mineral precipitation resulted from the following sequence of events:

(a) The metabolic activity of the *Bacillus pasteuri* produced urease.
(b) The urease cleaved the urea to produce ammonia.
(c) The ammonia increased the pH of the system, thus reducing the solubility of the calcium.
(d) The reduced solubility of the calcium led to its precipitation (as a carbonate), and the availability of the bacteria as nucleating sites may have contributed to the large particle size of the precipitate particles.

EXAMPLE 2

This example qualitatively illustrates the precipitation of a silica-containing colloidal suspension in the presence of Leuconostoc bacteria.

The bacteria used in this example were *Leuconostoc mesenteroides* B523 and were obtained from the U.S. Department of Agriculture, Northern Regional Laboratory, Peoria, Ill.

The silica-containing mineralization medium consisted of 3 grams of nutrient broth (as described in Example 1), 20 grams of glucose and 5 grams of silica (basis: 17 ml of a 30 weight % colloidal silica medium) per liter of distilled water. The pH of the medium was adjusted to 7.3, and the medium was then sterilized by heating in an autoclave.

The above noted Leuconostoc bacteria grew well in the mineralization medium, and mineral precipitation was visibly evident after several days.

*Leuconostoc mesenteroides* is a facultative anaerobe which produces lactic acid. The stability of colloidal silica suspensions is known to be reduced by an acidic pH. Accordingly, the precipitation which was observed in this example is partially attributed to the production of lactic acid by the Leuconostoc.

EXAMPLE 3

This example provides quantitative data describing the precipitation of a mineralization medium in the presence of bacterial growth, and the decrease in the permeability of a sand core which resulted from the precipitation.

The bacteria used in this example were *Bacillus pasteuri* NRS 673 (as described in Example 1). Similarly, the mineralization medium was the calcium-containing medium described in Example 1.

The apparatus used in this example generally consisted of a reservoir for the mineralization medium, a mineralization medium distribution system, and "sand cores".

The mineralization medium distribution system included a pump and tubing. The tubing included a header and individual distribution lines connecting the header to the sand cores. The mineralization medium was stored in a reservoir which was adapted to provide an essentially constant fluid pressure head. The distribution lines to the sand cores were arranged in "parallel". A peristaltic pump was used to pump the mineralization medium through the distribution system. Thus, the use of the pump, header and the parallel distribution lines ensured that essentially equivalent pressure fluid flow was provided to each of the sand cores. Measurement of the pressure drop across the cores was measured and formed to be about $6 \times 10^2$ atmospheres. The cores were supported in a vertical position, so that liquid could flow through them from top to bottom by gravity. An isolation valve was installed on each of the distribution lines so that a core could be isolated without cutting off the fluid flow to the remaining cores.

The bodies of the sand cores were fabricated from 30 cm lengths of clear plastic pipe having an inside diameter of 1.8 cm. The total volume of the core was about 85 ml. Sand was packed into the plastic pipe to produce the "sand cores".

Sieve analysis (using sieves having the "alternative" designation, defined in, CRC HANDBOOK OF TABLES FOR APPLIED ENGINEERING SCIENCE, ISBN 0-8493-0252-8) of this sand yielded a trace on #120, 4.6% on #140, 28.7% on #170, 26.7% on #200, 19.9% on #230, 6.3% on #270 and 13.8% in the pan.

The sand was packed into the plastic pipes with an agitated, aqueous slurry to release air bubbles and ensure a tight pack. The liquid slurry used for the comparative ("or control") core was sterile water (containing glutaraldehyde, to sterilize the core).

The slurry used in inventive cores 2 and 3 contained a culture of the *Bacillus pasteuri* NRS 673 bacteria used in Example 1.

After packing, the "pore volume" (i.e. the total void space between the sand particles) was about 25 ml for the cores of set 1 and about 27 ml for the cores of set 2.

The mineralization medium was then pumped into the cores at a low flow rate on a "once-through" basis (i.e. the liquid drained from the bottom of the core). The fluid which drained from the cores was collected in beakers, and the volume was measured to provide the "total fluid flow" figures shown in Table 1. As will be evident from a consideration of the data in Table 1, the flow rate of the fluid (i.e. the mineralization medium in the inventive cores) slowed as the experiment progressed. The flow rate data can be used to calculate the permeability of the core, using the well-known Darcy equation (as described, for example, in FLOW BEHAVIOR OF POLYMERS IN POROUS MEDIA, ISBN 0-87814-188-4).

The permeability of the cores was calculated at various time intervals, as indicated in Table 1 (Note: the "experiment number" for each experiment contains two digits: the first digit refers to the "set", the second digit refers to the core. Thus, for example, experiment 1-3 refers to set 1, core 3, and experiment 2-1 refers to set 2, core 1).

The data in Table 1 describe total fluid flow and permeability of the cores at selected time intervals. The data clearly indicate that the permeability of the control cores (which did not contain added microorganisms) did not substantially change during the experiments, whereas the permeability of the inventive cores did decrease.

The last "time" value recorded for each experiment in Table 1 represents the end of the time period during which the mineralization medium was added.

Subsequent to the completion of each experiment, the cores were analyzed as described below.

In general, the control (or comparative) cores (i.e. experiments 1-1 and 2-1) remained in the form of unconsolidated sand that was easily scooped out of the pipe. In contrast, the characteristics of the inventive cores (i.e. experiments 1-2, 1-3, 2-2, and 2-3) changed significantly after mineral precipitation. Sections of the inventive cores were clearly consolidated or "cemented". These cemented sections were removed from the core holders by cutting away the plastic pipe. The cemented sections did not disintegrate when placed under running tap water, or when dipped in such solvents as ethanol or varsol, but could be broken by a sharp impact. Acid treatment also caused the consolidated core material to effervesce and disintegrate.

A CAT scanner and an electron microscope were used for additional qualitative analysis of inventive cores.

The CAT scan images clearly indicated a pattern of plug formation by mineral precipitation. In particular, the cemented section of the analyzed cores showed dense areas having a parabolic profile, which is consistent with the pattern of fluid flow that would be expected in a small diameter tube.

The electron photomicrographs showed mineral deposits in the form of euhedral crystals, coral-like structures and sharp flakes. The micrographs also showed bacteria associated with the mineral crystals. Accordingly, the photomicrographs provide clear evidence of a microorganism—mineral "composite" precipitate.

A significant observation was the failure of the process to form precipitate on or in the inlet face of the core. Injection of full nutrient solutions to induce microbial growth or polymer formation in other biological plugging systems always entails the risk of microbial growth in the immediate wellbore region with a consequent loss of injectivity. In the present case the injected mineralization medium did not support such complications leaving the formation face clean and unplugged.

The cores were also quantitatively analyzed for bacteria counts.

Five samples were taken from the cores at approximately equivalent intervals along the length of the cores (with Section 1 being the top section and Section 5 being the bottom section).

Two different bacteria count methods were utilized. The cores from the first set of experiments were analyzed using a conventional "plate count" method. The cores from the second set of experiments were analyzed using a conventional "most probable number" method.

In the "plate count" method, clumps of bacteria which are attached to a mineral or sand particle are counted as a single colony. Conversely, in the "most probable number" method, microorganisms within the matrix can be separated with each separate group being counted as positive.

Accordingly, if the bacteria are clumped together, one would expect the "most probable number" technique to provide a substantially higher value than the "plate count" technique. This (expected) difference is generally indicated by the results shown in Table 2.

In summary, the permeability data provide evidence of plugging and consolidation within the inventive cores, and the electromicrograph and bacterial count data clearly indicate that the bacteria are associated with the mineral precipitation which causes the consolidation.

TABLE 1

Permeability Data
Set 1

| | Experiment | | | | | |
|---|---|---|---|---|---|---|
| | c 1-1 Cells/mL | | 1-2 Cells/mL | | 1-3 Cells/mL | |
| Time (Hour) | Cumulative Fluid Injection Number of (Pore Volumes b) | Permeability (Darcies) | Cumulative Fluid Injection Number of (Pore Volumes) | Permeability (Darcies) | Cumulative Fluid Injection Number of (Pore Volumes) | Permeability (Darcies) |
| 0 | 0 | 3.8 | 0 | 5.6 | 0 | n.d. |
| 0.8 | n.d. | n.d. | n.d. | n.d. | 8.0 | 13 |
| 14.5 | 40.4 | 4.3 | 50.0 | 5.0 | 56 | 11.7 |
| 23.5 | 68.8 | 3.8 | 79.6 | 4.1 | 68.8 | n.d. |
| 39.0 | 117.2 | 3.8 | 118.8 | 2.9 | 77.6 | 11 |
| 64.0 | 196.6 | 3.6 | 157.8 | 1.5 | 81.6 | 9.2 |
| 66.0 | n.d. | n.d. | n.d. | n.d. | 90.4 | 2.8 |
| 71.3 | 219.4 | 3.6 | 163.4 | 0.4 | | |

Set 2

TABLE 1-continued

| | Microbial Count Data Experiment | | | | | |
|---|---|---|---|---|---|---|
| | c 2-1 Cells/mL | | 2-2 Cells/mL | | 2-3 | |
| Time (Hour) | Total Flow Number of (Pore Volumes) | Permeability (Darcies) | Total Flow Number of (Pore Volumes) | Permeability (Darcies) | Total Flow Number of (Pore Volumes) | Permeability (Darcies) |
| 1.0 | 2.4 | 3.0 | 3.2 | 4.0 | 1.9 | 2.3 |
| 8.0 | 34.1 | 6.2 | 24.7 | 3.9 | 17.0 | 2.8 |
| 10.0 | 47.0 | 6.6 | 28.4 | 2.3 | 23.0 | 3.7 |
| 12.0 | 57.6 | 6.5 | 31.6 | 1.9 | 27.8 | 2.9 |
| 13.5 | n.d. | n.d. | 33.6 | 1.7 | 30.7 | 2.3 |
| 18.5 | 93.1 | 6.8 | 49.9 | 1.1 | 49.2 | 1.4 |
| 31.0 | 159.3 | 6.8 | 51.6 | 1.1 | 51.1 | 1.1 |
| 36.0 | 186.3 | 6.9 | 54.7 | 0.8 | 54.9 | 1.1 |
| 37.0 | 191.7 | 6.9 | n.d. | n.d. | n.d. | n.d. |
| 43.0 | | | 57.4 | 0.5 | 60.1 | 1.0 |
| 54.0 | | | 61.5 | 0.5 | 67.7 | 0.9 |
| 60.5 | | | 63.4 | 0.4 | n.d. | n.d. |
| 149.0 | | | | | 92.3 | 0.2 |

NOTES:
1. c = control
2. b: to convert pore volume into mL, Multiply the Number of Pore Volume by the total pore volume of the core sample.
3. In the Darcy equation calculations, the viscosity of the liquid was designated to be one centipoise and the pressure drop was designated as $6. \times 10^{-2}$ atmospheres.

TABLE 2

| Section | Experiment | | | | |
|---|---|---|---|---|---|
| | c 1-1 | 1-2 | 1-3 | c 2-1 | 2-2 |
| 1 | $<10^2$ | $1.0 \times 10^3$ | $4.0 \times 10^4$ | $<5 \times 10^1$ | $>5 \times 10^9$ |
| 2 | $<10^2$ | $<10^3$ | $1.0 \times 10^3$ | $<5 \times 10^1$ | $>5 \times 10^9$ |
| 3 | $3.0 \times 10^3$ | $1.0 \times 10^2$ | $1.2 \times 10^4$ | $<5 \times 10^1$ | $>5 \times 10^9$ |
| 4 | $<10^2$ | $3.0 \times 10^3$ | $5.0 \times 10^4$ | $<5 \times 10^1$ | $>5 \times 10^9$ |
| 5 | $<10^2$ | $10^3$ | $1.0 \times 10^3$ | $<5 \times 10^1$ | $>5 \times 10^9$ |

Notes:
1. c = control
2. Figures expressed in cells/ml
3. Plate Count method used for experiments 1-1, 1-2 and 1-3
4. Most Probable Number method used for experiments 2-1, 2-2

What is claimed is:

1. A process to reduce the permeability of a subsurface geological formation by mineral precipitation, said process consisting of:
   (i) providing to said formation a microorganism culture having the capability to sustain metabolic activity within the environment of said formation,
   (ii) injecting an aqueous mineralization medium into said formation, and
   (iii) precipitating mineral matter from said mineralization medium.

2. The process of claim 1 wherein said microorganism culture contains anaerobic bacteria.

3. The process of claim 2 wherein said bacteria are facultative anaerobes.

4. The process of claim 2 wherein said bacteria produce urease.

5. The process of claim 4 wherein said bacteria are selected from the family Bacillacae.

6. The process of claim 5 wherein said bacteria are provided to said formation by the injection of an aqueous, spore-containing slurry.

7. The process of claim 6 wherein said spore-containing slurry contains Bacillus spores.

8. The process of claim 1 wherein said mineralization medium further contains nutrients for said microorganisms.

9. The process of claim 8 wherein said nutrients include sugar.

10. The process of claim 9 wherein said sugar is glucose.

11. The process of claim 1 wherein said mineralization medium contains minerals based on elements selected from Ca, Si, Mg, Al, and Fe.

12. The process of claim 11 wherein said mineralization medium contains calcium chloride and urea.

13. The process of claim 12 wherein said microorganism consists of bacteria from the genus Bacillus.

14. A process to enhance the recovery of oil by reducing the permeability of an heavy oil reservoir, said process consisting of:
   (i) providing to said formation a microorganism culture having the capability to sustain metabolic activity within said reservoir,
   (ii) injecting an aqueous mineralization medium into said reservoir, and
   (iii) precipitating mineral matter from said mineralization medium.

15. The process of claim 14 wherein said microorganism culture is provided to said reservoir by injecting a slurry which contains spores from bacteria of the Bacillacae family.

16. The process of claim 15 wherein said bacteria are of the Bacillus genus.

17. The process of claim 16 wherein said mineralization medium contains urea and a water soluble calcium salt.

18. A process to consolidate sand in a subsurface geological formation by mineral precipitation, said process consisting of:
   (i) providing to said formation a microorganism culture having the capability to sustain metabolic activity within the environment of said formation,
   (ii) injecting an aqueous mineralization medium into said formation, and
   (iii) precipitating mineral matter from said mineralization medium.

19. The process of claim 18 wherein said microorganism culture contains anaerobic bacteria and wherein said mineralization medium contains urea and a water soluble calcium salt.

20. The process of claim 19 wherein said bacteria are provided to said formation by the injection of an aqueous, spore-containing slurry of which contains Bacillus spores.

21. The process of claim 20 wherein said bacteria are of the Bacillus genus.

22. The process of claim 21 wherein said mineralization medium contains urea and a water soluble calcium salt.

* * * * *